(12) United States Patent  
Song

(10) Patent No.: US 11,074,576 B2  
(45) Date of Patent: Jul. 27, 2021

(54) ELECTRONIC CERTIFICATE PROCESSING METHOD AND ELECTRONIC CERTIFICATE PROCESSING APPARATUS

(71) Applicant: TENCENT TECHNOLOGY (SHENZHEN) COMPANY LIMITED, Shenzhen (CN)

(72) Inventor: Zhigang Song, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 336 days.

(21) Appl. No.: 15/963,483

(22) Filed: Apr. 26, 2018

(65) Prior Publication Data

US 2018/0247304 A1    Aug. 30, 2018

Related U.S. Application Data

(63) Continuation of application No. PCT/CN2017/087891, filed on Jun. 12, 2017.

(30) Foreign Application Priority Data

Jun. 12, 2016 (CN) .......................... 201610409602.1

(51) Int. Cl.
*G06Q 30/00* (2012.01)
*G06Q 20/38* (2012.01)
*G06Q 30/02* (2012.01)

(52) U.S. Cl.
CPC ....... *G06Q 20/3821* (2013.01); *G06Q 20/387* (2013.01); *G06Q 30/0208* (2013.01); *G06Q 30/0239* (2013.01)

(58) Field of Classification Search
None
See application file for complete search history.

(56) References Cited

U.S. PATENT DOCUMENTS

2007/0156513 A1 * 7/2007 Mastrianni ......... G06Q 30/0208  
                                                    705/14.11
2007/0241189 A1 * 10/2007 Slavin .................... G06Q 30/02  
                                                    235/383

(Continued)

FOREIGN PATENT DOCUMENTS

CN     103177370 A     6/2013
CN     103366291 A     10/2013

(Continued)

OTHER PUBLICATIONS

Opromolla, Antonio, Andrea Ingrosso, Valentina Volpi, Mariarosaria Pazzola, and Carlo Maria Medaglia. "A user-centered approach in designing NFC couponing platform: The case study of CMM applications." In International Conference on HCI in Business, pp. 360-370. Springer, Cham, 2014. (Year: 2014).*

(Continued)

*Primary Examiner* — Michael Bekerman
(74) *Attorney, Agent, or Firm* — Oblon, McClelland, Maier & Neustadt, L.L.P.

(57) ABSTRACT

The present disclosure provides an electronic certificate processing method that includes: generating, based on an identifier of a first user, a first electronic certificate by using which the first user obtains a target product, and sending the first electronic certificate to the first user; receiving a sharing request for the first electronic certificate; determining, based on an identifier carried in the first electronic certificate, the target product that can be obtained by the first user by using the first electronic certificate; determining a second user having a social relationship with the first user and satisfying a sharing condition, and generating, based on an identifier of the second user, a second electronic certificate by using which the second user obtains the target product, the identifier carried in the second electronic certificate being different from that of the first electronic certificate; and sending (Continued)

the second electronic certificate to the second user, which is used for enabling the second user to obtain the target product.

10 Claims, 12 Drawing Sheets

(56) References Cited

U.S. PATENT DOCUMENTS

| | | | | |
|---|---|---|---|---|
| 2012/0054010 A1* | 3/2012 | Bouta | ............... | G06Q 30/0214 705/14.16 |
| 2012/0215610 A1* | 8/2012 | Amaro | ............... | G06Q 30/02 705/14.23 |
| 2012/0284093 A1* | 11/2012 | Evans | ............... | H04W 4/21 705/14.1 |
| 2012/0303435 A1* | 11/2012 | Rawat | ............... | G06Q 50/01 705/14.27 |
| 2013/0006738 A1* | 1/2013 | Horvitz | ............... | G06Q 30/0207 705/14.16 |
| 2013/0173372 A1* | 7/2013 | Misra | ............... | G06Q 30/0222 705/14.23 |
| 2013/0246185 A1* | 9/2013 | Hardman | ............... | G06Q 50/01 705/14.66 |
| 2014/0006153 A1* | 1/2014 | Thangam | ............... | G06Q 50/01 705/14.53 |
| 2014/0304085 A1* | 10/2014 | Liu | ............... | G06Q 30/0269 705/14.66 |
| 2015/0127439 A1 | 5/2015 | Campos De Figueiredo Faceira et al. | | |

FOREIGN PATENT DOCUMENTS

| | | | |
|---|---|---|---|
| CN | 103635923 | A | 3/2014 |
| CN | 105321110 | A | 2/2016 |
| CN | 105574745 | A | 5/2016 |
| CN | 106096962 | A | 11/2016 |

OTHER PUBLICATIONS

Hsueh, Sue-Chen, and Jun-Ming Chen. "Sharing secure m-coupons for peer-generated targeting via eWOM communications." Electronic Commerce Research and Applications 9.4 (2010): 283-293. (Year: 2010).*

International Search Report of PCT/CN2017/087891 (w/English translation).

Office Action dated Jun. 6, 2018 in Chinese Application No. 201610409602.1 (w/partial English translation).

* cited by examiner

ELECTRONIC CERTIFICATE PROCESSING METHOD AND ELECTRONIC CERTIFICATE PROCESSING APPARATUS

RELATED APPLICATION

This application is a continuation of International Application No. PCT/CN2017/087891, filed on, Jun. 12, 2017, which claims priority to Chinese Patent Application No. 201610409602.1, entitled "ELECTRONIC CERTIFICATE PROCESSING METHOD AND ELECTRONIC CERTIFICATE PROCESSING APPARATUS" filed with the Chinese Patent Office on Jun. 12, 2016. The entire disclosures of the prior applications are hereby incorporated by reference in their entirety.

FIELD OF THE TECHNOLOGY

The present disclosure relates to electronic certificate technologies in the communications field, and in particular, to an electronic certificate processing method and an electronic certificate processing apparatus.

BACKGROUND OF THE DISCLOSURE

As the mobile Internet rapidly develops, paper certificates in each industry evolve into electronic certificates. For example, electronic coupons such as electronic exchange-type coupons and electronic discount-type coupons are widely used. Users may access a page of a merchant by using a terminal (for example, a mobile terminal such as a smartphone or a tablet computer) and obtain various electronic certificates with or without payment.

Using electronic discount-type coupons as an example, a user may access a product promoting page of a merchant, download an electronic discount-type coupon of a specific (or all) product or service, store the electronic discount-type coupon on a mobile terminal of the user, and use the stored electronic discount-type coupon to deduct part of cost when needing to use a corresponding product.

However, due to mismatch of a user, a use space, or a use time during delivery and use of related electronic certificates, the electronic certificates may be invalidly downloaded, thereby affecting the use efficiency of the electronic certificates. For this problem, no effective solution has been provided.

SUMMARY

Embodiments of the present disclosure provide an electronic certificate processing method and an electronic certificate processing apparatus, so as to improve the effective utilization of an electronic certificate.

The technical solutions of the present disclosure are implemented in this way:

According to a first aspect, the embodiments of the present disclosure provide an electronic certificate processing method implemented by processing circuitry of an electronic certificate processing apparatus, the method including:

generating, based on an identifier of a first user, a first electronic certificate by using which the first user obtains a target product, and sending the first electronic certificate to the first user;

receiving a sharing request for the first electronic certificate;

determining, based on an identifier of the first electronic certificate, the target product that can be obtained by the first user by using the first electronic certificate;

determining a second user having a social relationship with the first user and satisfying a sharing condition, and generating, based on an identifier of the second user, a second electronic certificate by using which the second user obtains the target product, the identifier carried in the second electronic certificate being different from that of the first electronic certificate; and sending the second electronic certificate to the second user, the second electronic certificate being used for enabling the second user to obtain the target product.

Optionally, the method further includes:

obtaining a preference of the first user, comparing the preference of the first user with a feature of each candidate product, and determining the target product of the candidate products that satisfies the preference of the first user.

Optionally, the method further includes:

sending information about each candidate product supporting obtaining of a corresponding electronic certificate to the first user; and extracting information about the target product from an electronic certificate request sent by the first user, the target product being a product selected by the first user from the candidate products.

Optionally, the determining a second user having a social relationship with the first user and satisfying a sharing condition includes:

comparing a geographical location of each candidate user having a social relationship with the first user with a geographical location of the first user, and determining the second user of the candidate users that has a geographical location distance to the first user less than a geographical distance threshold.

Optionally, the determining a second user having a social relationship with the first user and satisfying a sharing condition includes:

determining a candidate user that is of candidate users having a social relationship with the first user and that has a social distance to the first user in a social relationship chain less than a social distance threshold as the second user.

Optionally, the determining a second user having a social relationship with the first user and satisfying a sharing condition includes:

determining the second user that is of candidate users having a social relationship with the first user and that has a third electronic certificate, a product obtaining location corresponding to the third electronic certificate being a location of the first user.

Optionally, the method further includes:

generating a fourth electronic certificate based on the identifier of the first user, and sending the fourth electronic certificate to the first user; and canceling a valid state of the third electronic certificate of the second user, a product obtained by the first user by using the fourth electronic certificate being the same as a product obtained by the second user by using the third electronic certificate.

Optionally, the method further includes:

extracting the sharing condition set by the first user from the sharing request, or generating the sharing condition according to a feature of the first user.

Optionally, the method further includes:

when receiving a sharing request sent by the first user for the first electronic certificate, determining whether the first user has a sharing permission for the first electronic certificate, and if yes, determining to respond to the sharing request; or if no, skipping responding to the sharing request.

Optionally, the determining whether the first user has a sharing permission for the first electronic certificate includes:

if a feature value of the first electronic certificate does not exceed a feature value threshold, determining that the first user has the sharing permission; or if exceeds, determining that the first user does not have the sharing permission.

Optionally, the method further includes:

determining an award limit of the first user according to a feature value of the first electronic certificate, and performing at least one of the following operations based on the award limit:

adding an account of money corresponding to the award limit to an account of the first user sending an electronic red envelope corresponding to the award limit to the first user; or sending an electronic certificate of a service whose cost corresponds to the award limit to the first user.

Optionally, the feature value of the first electronic certificate includes at least one of the following: a quantity of times for which the first user shares the first electronic certificate, or a frequency at which the first user shares the first electronic certificate.

Optionally, the method further includes:

after the second electronic certificate by using which the second user obtains the target product is generated, canceling a valid state of the first electronic certificate, and skipping responding to a request of the first user for obtaining the target product by using the first electronic certificate.

Optionally, the first electronic certificate carries cost waiving information being used for waiving at least part of cost when the first user obtains the target product.

Optionally, the sending the second electronic certificate to the second user includes:

sending sharing information for the first electronic certificate to the second user; and sending the generated second electronic certificate to the second user in response to a request of the second user for obtaining an electronic certificate for the target product.

According to a second aspect, the embodiments of the present disclosure provide an electronic certificate processing apparatus, the electronic certificate processing apparatus including:

processing circuitry configured to:

generate, based on an identifier of a first user, a first electronic certificate by using which the first user obtains a target product, and send the first electronic certificate to the first user; and determine, based on an identifier of the first electronic certificate, the target product that can be obtained by the first user by using the first electronic certificate;

receive a sharing request for the first electronic certificate, and determine a second user having a social relationship with the first user and satisfying a sharing condition; and generate, based on an identifier of the second user, a second electronic certificate by using which the second user obtains the target product, and send the second electronic certificate to the second user, the identifier carried in the second electronic certificate being different from that of the first electronic certificate and being used for enabling the second user to obtain the target product.

Optionally, the processing circuitry is further configured to: obtain a preference of the first user, compare the preference of the first user with a feature of each candidate product, and determine the target product of the candidate products that satisfies the preference of the first user.

Optionally, the processing circuitry is further configured to: send information about each candidate product supporting obtaining of a corresponding electronic certificate to the first user; and extract information about the target product from an electronic certificate request sent by the first user, the target product being a product selected by the first user from the candidate products.

Optionally, the processing circuitry is further configured to: compare a geographical location of each candidate user having a social relationship with the first user with a geographical location of the first user, and determine the second user of the candidate users that has a geographical location distance to the first user less than a geographical distance threshold.

Optionally, the processing circuitry is further configured to determine the second user that is of candidate users having a social relationship with the first user and that has a third electronic certificate, a product obtaining location corresponding to the third electronic certificate being a location of the first user.

Optionally, the processing circuitry is further configured to: generate a fourth electronic certificate based on the identifier of the first user, and send the fourth electronic certificate to the first user; and cancel a valid state of the third electronic certificate of the second user, a product obtained by the first user by using the fourth electronic certificate being the same as a product obtained by the second user by using the third electronic certificate.

Optionally, the processing circuitry is further configured to determine a candidate user that is of candidate users having a social relationship with the first user and that has a social distance to the first user in a social relationship chain less than a social distance threshold as the second user.

Optionally, the processing circuitry is further configured to extract the sharing condition set by the first user from the sharing request, or generate the sharing condition according to a feature of the first user.

Optionally, after the second electronic certificate is generated by using which the second user obtains the target product, the processing circuitry cancels a valid state of the first electronic certificate, and skips responding to a request of the first user for obtaining the product by using the first electronic certificate.

Optionally, the processing circuitry is further configured to: when receiving a sharing request sent by the first user for the first electronic certificate, determine whether the first user has a sharing permission for the first electronic certificate, and if yes, determine to respond to the sharing request; or if no, skip responding to the sharing request.

Optionally, the processing circuitry is further configured to: if a feature value of the first electronic certificate does not exceed a feature value threshold, determine that the first user has the sharing permission; or if exceeds, determine that the first user does not have the sharing permission.

Optionally, the processing circuitry is further configured to determine an award limit of the first user according to a feature value of the first electronic certificate, and perform at least one of the following operations based on the award limit:

adding an account of money corresponding to the award limit to an account of the first user;

sending an electronic red envelope corresponding to the award limit to the first user; or sending an electronic certificate of a service whose cost corresponds to the award limit to the first user.

Optionally, the processing circuitry is further configured to send sharing information for the first electronic certificate to the second user; and the processing circuitry is further configured to: send the generated second electronic certificate to the second use in response to a request of the second user for obtaining an electronic certificate for the target product.

The embodiments of the present disclosure have the following beneficial effects: the first user spreads the first electronic certificate to the second user by means of sharing, so that the second user requiring using a corresponding product collects the second electronic certificate on a transaction platform background. Because users in a social relationship chain usually have same preferences, the utilization of an electronic certificate can be greatly improved by spreading the electronic certificate in the social relationship chain of the first user.

DESCRIPTION OF EMBODIMENTS

Figure 1:
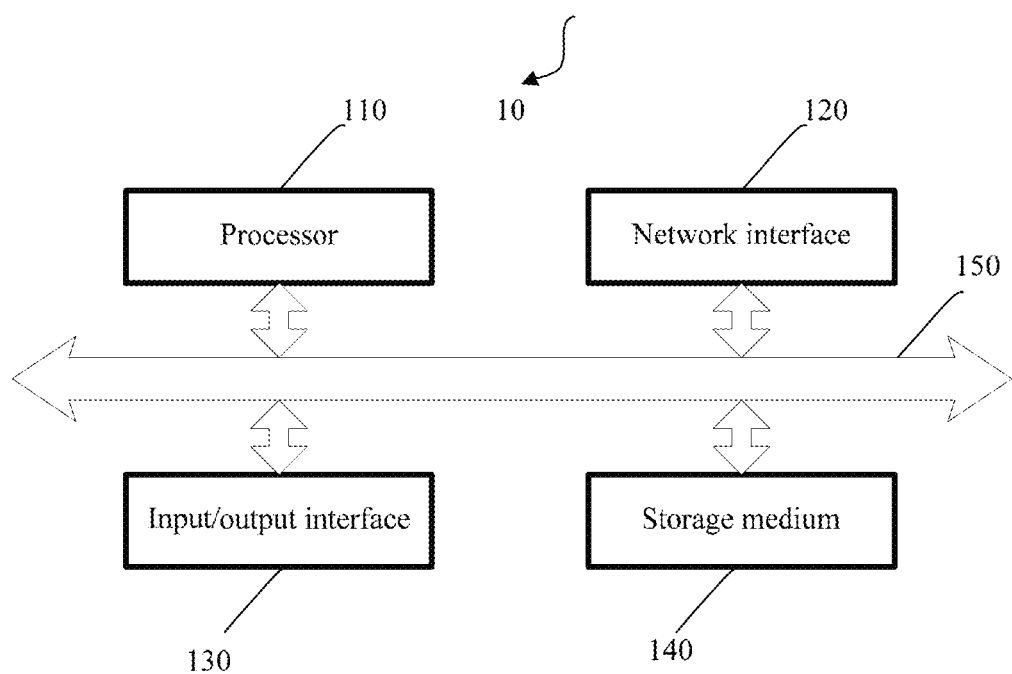
FIG. 1 is an optional schematic structural hardware diagram of a server for implementing an electronic certificate processing apparatus according to an embodiment of the present disclosure.

The following further describes the present disclosure in detail with reference to the accompanying drawings and the embodiments. It should be understood that the embodiments provided herein are merely used for explaining the present disclosure but are not intended to limit the present disclosure. In addition, the embodiments provided below are intended to implement some but not all of the embodiments of the present disclosure. The technical solutions in the embodiments of the present disclosure may be combined together for implementation provided that there is no conflict.

It should be noted that, in the embodiments of the present disclosure, the terms "first", "second", "third", "fourth" and the like are merely intended to distinguish between similar objects rather than describe specific orders. It may be understood that, the data termed in such a way is interchangeable in proper circumstances, and therefore the embodiments of the present disclosure described herein can be implemented in orders other than the order illustrated or described herein.

The following explanations are applicable to the nouns and terms in the embodiments of the present disclosure:

1) Product, including physical product and service product. A physical product is a product in a physical form, such as food or an electronic product; a service product is a product in a non-physical form, such as application software, a network game item, service consultation, mailing and delivery, or maintenance.

2) Electronic certificate, a certificate that can be presented on an electronic device and by using which a user obtains a product, and is generated by a transaction platform according to an identifier of a user. An electronic certificate at least carries an identifier of the uniqueness of the electronic certificate (which is also referred to as an identifier of the electronic certificate, and identifiers of different electronic certificates are different, to distinguish between different electronic certificates).

Being only an example, from the respective of presentation manner, a manner of presenting an electronic certificate on an electronic device may include, for example, a graphical (for example, a two-dimensional barcode or a barcode) manner, an electrical signal (for example, a near field communication signal) manner, an acoustic signal (for example, an ultrasonic signal) manner, and an optical signal (for example, an infrared signal) manner. From the respective of application scenario, an electronic certificate may include, for example, an electronic coupon such as an electronic discount-type coupon or an electronic voucher type coupon, or may be an electronic exchange type coupon directly used for exchanging for (or using) a product.

3) Client, a user-side electronic device such as a mobile terminal (a smartphone, a tablet computer, or an in-vehicle terminal) or a fixed terminal (a desktop computer). The client is capable of presenting an electronic certificate in at least one of the foregoing manners. For example, a display screen is disposed on the client to present the electronic certificate in a graphical manner, or a graphical data output interface is disposed on the client to display the electronic certificate on an external display device. For another example, the client outputs, by using an ultrasonic module, an ultrasonic signal to which information is added through modulation, or outputs, by using a near field communication module, a near field communication signal to which information is added through modulation.

4) Transaction platform, a platform on which a merchant provides a product, and implemented by a transaction platform background server. A client accesses the transaction platform background server to obtain data of a merchant, and loads a transaction platform interface on a graphical interface of the client based on the data. The transaction platform interface includes product information stored on the transaction platform background server, for example, information about a product that may provide a corresponding electronic certificate.

5) Social platform, a platform providing a social service for a user, and implemented by a social platform background server. A client accesses the social platform background server and loads a social platform interface on a graphical interface of the client. The social platform interface supports a user to initiate an operation of sharing information with other users on the social platform. The social platform background supports and responds to the sharing operation and sends the information to clients of the other users.

6) User identifier, information used for uniquely identifying a user, such as a name of an account registered by the user on a social platform, or a name of an account registered by the user on a transaction platform, or may be a phone number, an electronic mailbox and a device serial number of a client of the user.

7) Identifier of electronic certificate, information used for uniquely identifying an electronic certificate, and correspondingly generated by a transaction platform background when the electronic certificate is generated. The transaction platform background can determine, based on the identifier of the electronic certificate, a user having the electronic certificate (for example, distinguish different users by using identifiers of the users) and a product that can be obtained by using the electronic certificate (which is also referred to as a target product in the embodiments of the present disclosure).

The embodiments of the present disclosure may provide an electronic certificate processing method and an electronic certificate processing apparatus. During actual application, functional modules in the electronic certificate processing apparatus may be cooperatively implemented by hardware resources of a server or a server cluster, for example, a calculation resource such as a processor, and a communication resource (for example, being used for supporting implementation of various types of communication such as optical cable communication and cellular communication). FIG. 1 is an exemplary optional schematic structural hardware diagram of a server 10. The server 10 includes: a processor 110, an input/output interface 130 (for example, one or more of a display, a keyboard, a touchscreen, or a speaker microphone), a storage medium 140, and a network interface 120. The components may be connected by using a system bus 150 for communication.

Figure 2:
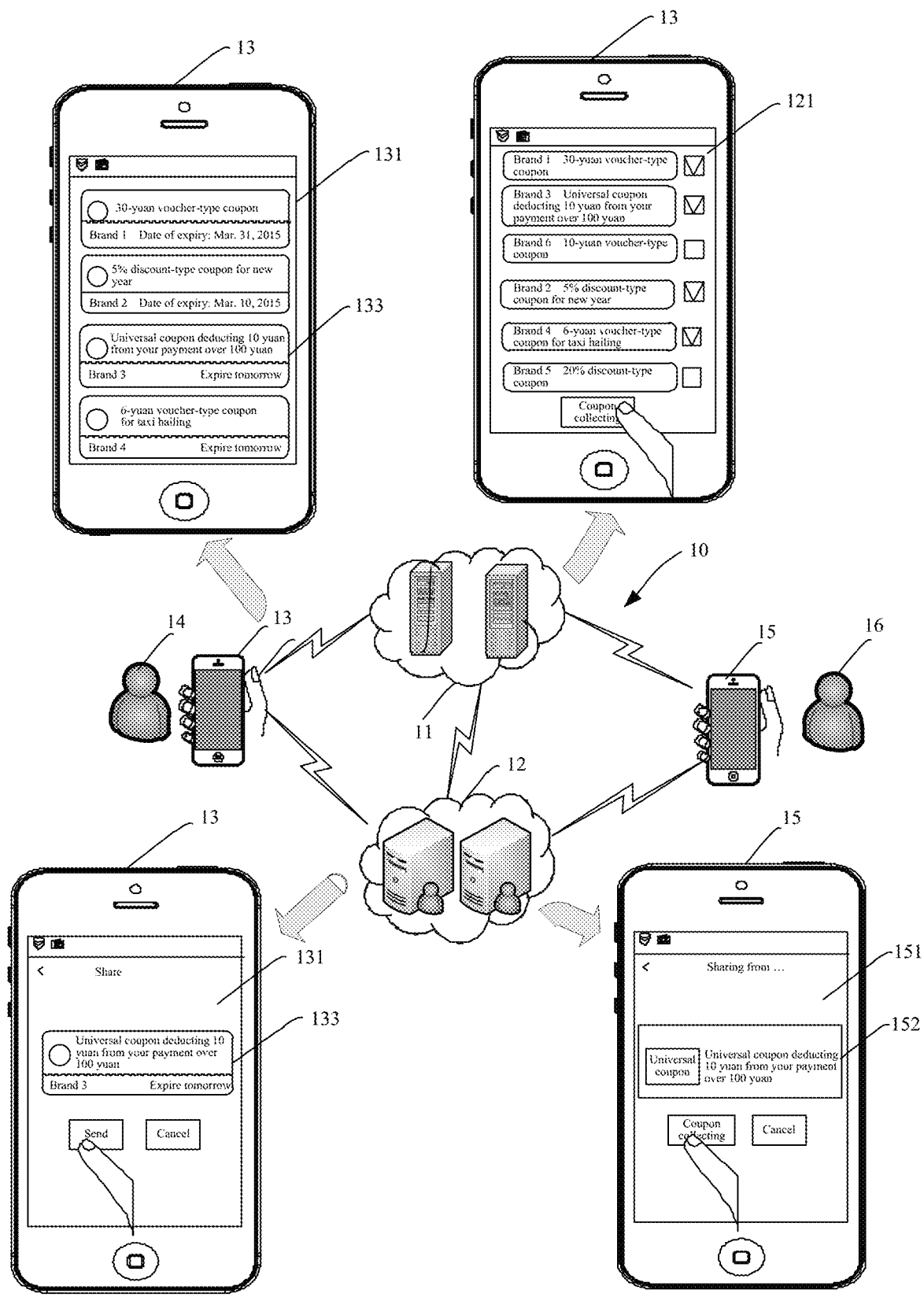
FIG. 2 is an optional schematic scenario diagram of an electronic certificate processing method according to an embodiment of the present disclosure.

FIG. 2 is an optional schematic architectural diagram of a hardware resource of a server or server cluster for implementing an electronic certificate processing apparatus 10. The electronic certificate processing apparatus 10 includes a social platform background server 12 (social platform background 12 for short) and a transaction platform background server 11 (transaction platform background 11 for short). It should be noted that, in FIG. 2, an example is used for description in which functional modules in the electronic certificate processing apparatus are implemented as two independent servers (or server clusters). Certainly, the implementation of the electronic certificate processing apparatus is not limited thereto. For example, all functional modules in the electronic certificate processing apparatus may be implemented as one server (or server cluster) or a plurality of servers (server clusters). A hardware implementation of the electronic certificate processing apparatus is not limited in the embodiments of the present disclosure.

In addition, the embodiments of the present disclosure are not limited to provide the electronic certificate processing method and the electronic certificate processing apparatus. For example, the embodiments of the present disclosure may provide executable instructions used for performing an electronic certificate processing method and stored in a storage medium (for example, a flash, an optical disc, or a hard disk).

Figure 3A:
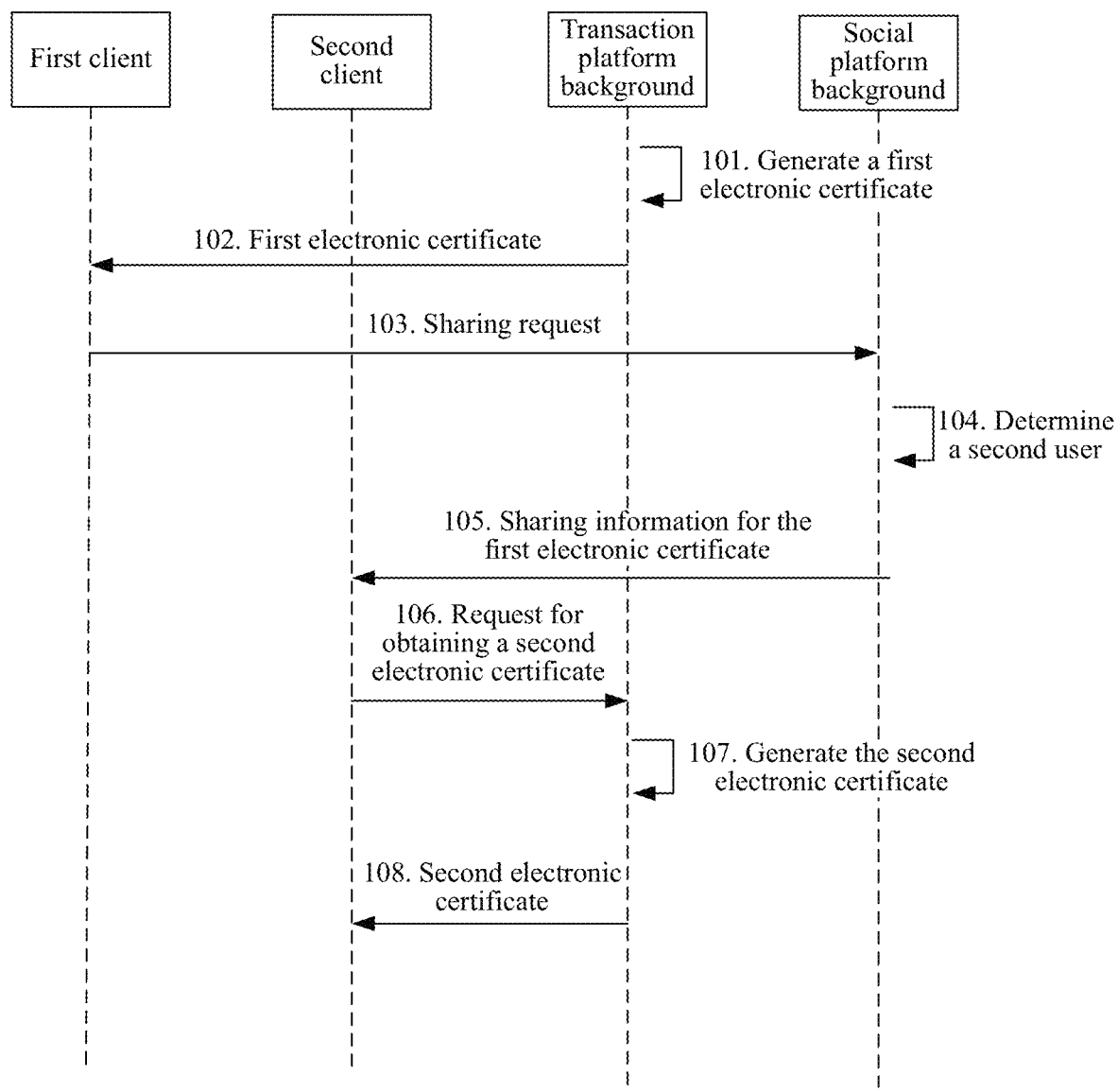
FIG. 3A to FIG. 3E are an optional schematic flowchart of an electronic certificate processing method according to an embodiment of the present disclosure.

With reference to FIG. 2, a first user 14 is a user having a first client 13, and a second user 16 is a user having a second client 15. Referring to FIG. 3A, FIG. 3A is an optional schematic flowchart of an electronic certificate processing method in which each step of the method is described.

It should be noted that, the following describes processing performed on an electronic certificate from the respective of an interaction between a transaction platform background 11, a social platform background 12, and a client. Because the client is a user-side device (for example, the client 13 shown in FIG. 2 is a device of the first user side 14), sending information to the client is equivalent to sending information to the user.

Step 101: The transaction platform background 11 generates, based on an identifier of the first user 14, a first electronic certificate by using which the first user 14 obtains a target product.

The first electronic certificate may be generated by the transaction platform background 11 in response to a request of the first user 14 for an electronic certificate of the target product 14, that is, the target product is designated by the first user 14; or may be actively generated by the transaction platform background 11 after a product preferred by the first user 14 (the target product) is determined, that is, the target product is automatically determined by the transaction platform background 11. The following describes, by way of example, how to determine the target product.

In some embodiments, the first electronic certificate may be generated by the transaction platform background 11 in response to a request of the first user 14 for an electronic certificate of the target product. Referring to FIG. 2, to generate the electronic certificate for the user selectively to ensure the utilization of the electronic certificate generated for the user, the transaction platform background 11 sends, in response to a request of the first client 13 for accessing a transaction platform interface, data of the transaction platform interface to the first client 13, so that the first client 13 locally loads a transaction platform interface 121. The transaction platform interface 121 includes information about a candidate product whose corresponding electronic certificate may be obtained, for example, a product name, a type of an electronic certificate used for obtaining a corresponding product (for example, an electronic discount-type coupon or an electronic voucher-type coupon), and cost (for example, the amount of discount provided by an electronic discount-type coupon, or the amount of deduction provided by an electronic voucher-type coupon) that can be waived when a corresponding electronic certificate is used for obtaining a product. After the first user 14 selects a product (the target product) requiring a corresponding electronic certificate from the candidate products on the transaction platform interface 121, a request for collecting the electronic certificate of the target product is sent to the transaction platform background 11.

The following continues to describe the foregoing embodiments. In response to the request for the electronic certificate, the transaction platform background 11 extracts an identifier of the target product from the request for the electronic certificate sent by the first client 13 and generates an electronic certificate of a corresponding product (the first electronic certificate) for the first user 14. Necessary information carried in the first electronic certificate includes: an identifier (for example, a serial number or a graphical code) of the first electronic certificate and the identifier of the first user 14.

In addition, other optional information carried in the first electronic certificate may include: information about the target product, for example, the identifier (for example, a name or a serial number) of the product, a type of the electronic certificate (for example, an electronic discount-type coupon or an electronic voucher-type coupon), cost waiving information obtained by using the electronic certificate, information about the target product, and information about a merchant providing the target product (for example, a name of the merchant or an address of the merchant). Certainly, the foregoing optional information may be maintained on the transaction platform background 11 in a form of recording data corresponding to the first electronic certificate, and the transaction platform background 11 authenticates use of the first electronic certificate based on the information carried in the first electronic certificate and the maintained corresponding recording data.

For example, recording data of an electronic certificate is generated when the electronic certificate is generated on the transaction platform background 11. Using the first electronic certificate as an example, for example, the recording data corresponding to the first electronic certificate includes: the identifier of the first electronic certificate, the identifier of the first user 14 to whom a corresponding electronic certificate is distributed, information (for example, a name or a serial number) about a product that can be obtained by the first user 14 by using the first electronic certificate, and information about a merchant providing the product (for example, a name of the merchant or an address of the merchant). Based on the recording data of the first electronic certificate, the transaction platform background 11 authenticates the legality of the use of the first electronic certificate by the first user 14. The authentication succeeds if the identifier of the first user 14 and the identifier of the first electronic certificate carried in the first electronic certificate submitted by the first user 14 are consistent with corresponding identifiers in the recording data, and cost caused by the use of the target product by the first user 14 is waived.

It can be learned that, in the foregoing embodiment in which a corresponding electronic certificate is generated in response to a request for the electronic certificate of the target product, because the corresponding electronic certificate is generated in response to the request of the first client 13, the electronic certificate is certainly most preferred by the first user 14, and the probability that the electronic certificate is subsequently used by the first user 14 is the highest, thereby ensuring the utilization of the electronic certificate.

In other embodiments, the first electronic certificate may be actively generated by the transaction platform background 11 after a product preferred by the first user 14 (the target product) is determined. When the user may not have time to log in to the transaction platform interface by using the client to select an electronic certificate corresponding to a product required to be used, or the amount of information about the candidate products that is maintained on the transaction platform background 11 is very large, it is difficult for the user to rapidly find the electronic certificate corresponding to the required product (the target product). To help the user rapidly locate the electronic certificate of the required product (so as to use the electronic certificate efficiently and improve the utilization), the transaction platform background 11 determines, by analyzing a historical recording of electronic certificate use of the first user 14, a preference of product use of the first user 14, compares the preference of the first user 14 with a feature of each candidate product, determines a product of the candidate products that satisfies the preference of the first user 14 as the target product, and generates an electronic certificate (the first electronic certificate) of the corresponding product for the first user 14.

For example, the transaction platform background 11 obtains, by analyzing the historical recording of electronic certificate use of the first user 14, preferences in a plurality of dimensions of product use of the first user 14, such as classification of product (cosmetics or electronic products), price range of product (for example, different price ranges such as 0-100, 100-500, and 500-1000), production place (for example, domestic or imported), or degree of positive commenting. For example, when it is learned that the first client 13 prefers domestic cosmetics with a price range of 500-1000, a product that is of the candidate products and that satisfies the feature is used as the product most preferred by the first user 14, and a corresponding electronic discount-type coupon or electronic voucher-type coupon is generated for the first user 14.

In addition, to more accurately and comprehensively determine the preferred product of the first user 14, considering that the first user 14 usually has a same preference in some aspect as that of another user having a social relationship on a social platform, the transaction platform background 11 may compare the preference of the user having a social relationship with the first user 14 on the social platform (a social user for short, for example, a friend) with the features of the candidate products, and determine a product of the candidate products that satisfies the preference of the social user as the target product.

For example, when the first user 14 does not have a record of electronic certificate use, the preferred product of the social user of the first user 14 is used as a preferred product (the target product) of the first user 14, and an electronic certificate (the first electronic certificate) of the corresponding product is generated for the first user 14.

Step 102: The transaction platform background 11 sends the first electronic certificate to the first client 13.

Figure 4:
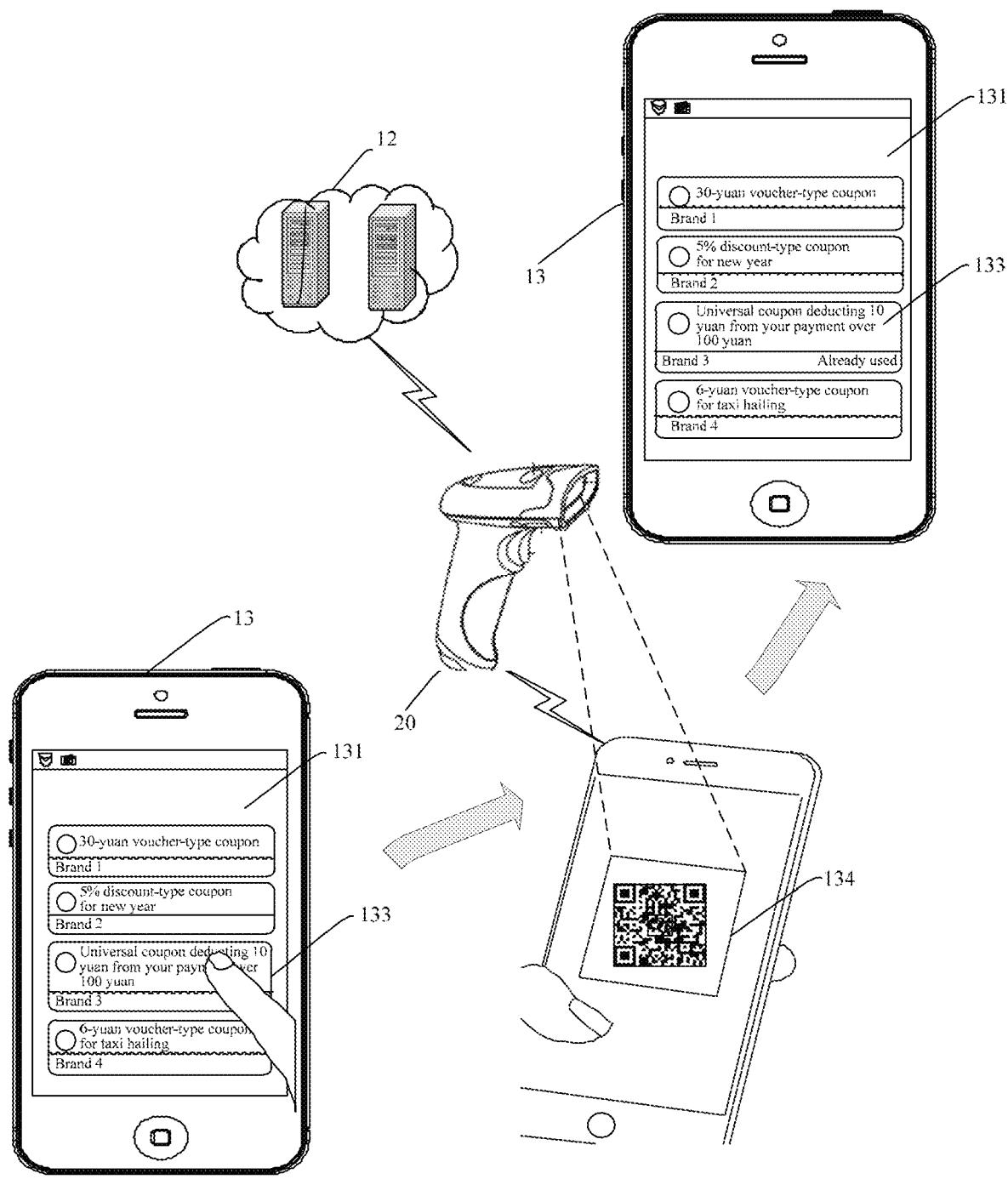
FIG. 4 is an optional schematic scenario diagram of an electronic certificate processing method according to an embodiment of the present disclosure.

In some embodiments, FIG. 4 is an optional schematic scenario diagram showing that the first user 14 uses the first electronic certificate. A graphical identifier of an electronic certificate obtained by the first client 13 on a graphical interface 131 of the first client 13 includes a graphical identifier of an electronic certificate of the target product (which may be a product selected by the first user 14 from candidate products, or a preferred product of the first user 14 determined by the transaction platform background 11). When the first electronic certificate (for example, a brand 3-universal coupon deducting 10 yuan from your payment over 100 yuan 133) to be used by the first client 13 has a graphical identifier, the first client 13 presents, in a form of a graphical code 134, information such as the identifier of the first electronic certificate and the identifier of the first user 14 that are carried in the electronic certificate, so that the identifier of the first electronic certificate and the identifier of the first user 14 are obtained by scanning by a merchant by using a scan device and sent to the transaction platform background 11 for authentication. The transaction platform background 11 performs authentication based on recording data of electronic certificates generated for different users, for example, authenticates whether the identifier of the first user 14 and the identifier of the first electronic certificate are consistent with corresponding identifiers in the recording data, and whether the first electronic certificate is out of a valid date. If the authentication succeeds, a result is sent to the merchant, so that the merchant provides a product to the first user 14 and updates a state of the first electronic certificate (for example, the brand 3-universal coupon deducting 10 yuan from your payment over 100 yuan 133) to be a used state.

The foregoing embodiment is described by using the example in which the first electronic certificate is used by the first user 14 offline. Certainly, the first electronic certificate obtained by the first client 13 may alternatively be used during online transaction. Using an example in which the first electronic certificate is the brand 3-universal coupon deducting 10 yuan from your payment over 100 yuan 133 shown in FIG. 2, when accessing the transaction platform 11, the first user 14 chooses to use a product of brand 3, and uses the stored brand 3-universal coupon deducting 10 yuan from your payment over 100 yuan 133 to deduct part of cost when paying for the obtained product of brand 3.

Step 103: The social platform background 12 receives a sharing request for the first electronic certificate sent by the first client 13.

In some embodiments, further using FIG. 2 as an example, graphical identifiers of four electronic certificates are loaded on the graphical interface 131 of the first client 13. If a user expects to share the first electronic certificate, that is, the brand 3-universal coupon deducting 10 yuan from your payment over 100 yuan 133, the user performs a trigger operation for sharing on the graphical interface 131.

Step 104: The social platform background 12 determines a second user 16 having a social relationship with the first user 14 on the social platform and satisfying a sharing condition.

The second user 16 is a target user with whom the first electronic certificate is shared. The second user 16 may be set by the first user 14 according to a requirement, or may be automatically determined by the social platform background 12. The two manners are described below.

In some embodiments, a sharing condition corresponding to the second user 16 may be generated by the social platform background 12 based on features in different dimensions of the first user 14 and locally maintained, and the second user 16 is determined based on the sharing condition when the sharing request sent by the first client 13 is received. That the second user 16 is determined according to the sharing condition is described with reference to different examples below.

Example 1): Comparing a geographical location of each candidate user having a social relationship with the first user 14 on the social platform with a geographical location of the first user 14, and determining a candidate user that has a geographical location distance to the first user 14 less than a geographical distance threshold as the second user 16.

In Example 1), the use of an electronic certificate has a territorial nature. Assuming that the first user 14 locates near a merchant and happens to have an electronic certificate (the first electronic certificate) of a product of the merchant, if an electronic certificate (a second electronic certificate) of the product provided by the merchant is sent to the second user 16 located near the first user 14, the utilization of the electronic certificate can be greatly improved.

Example 2): Determining a candidate user that is of candidate users having a social relationship with the first user 14 on the social platform and that has a social distance to the first user 14 in a social relationship chain less than a social distance threshold as the second user 16.

In Example 2), the social distance is a distance between users in a social relationship chain. Using a social relationship chain A-B-C-D-E as an example, users A and B, B and C, C and D, and D and E on the social platform are a direct contact of each other, so that a distance between the users in the social relationship chain may be measured by a quantity of contacts between the users. For example, the users A and B may be in direct contact, so that the social distance is 0; a social relationship between the users A and C can be established only by associating with the contact B, so that the social distance is 1. It can be learned that a greater social distance between the users indicates a weaker social association relationship between the users. Therefore, by using the second user 16 having a social distance to the first user 14 in the social relationship chain less than a social distance threshold as a target user to whom the second electronic certificate is subsequently sent, the utilization of the electronic certificate is greatly improved.

In some embodiments, the social platform background 12 determines the sharing condition corresponding to the first user 14 according to information such as the activeness on the social platform, a frequency of product use, and a quantity of times of product use of the first user 14. The activeness on the social platform, the frequency of product use, and the quantity of times of product use are in positive correlation to thresholds (the geographical distance threshold and the social distance threshold) in the sharing condition.

For example, a higher activeness of the first user 14 on the social platform indicates a greater geographical location threshold corresponding to the first user 14 in the sharing condition, so that users with whom the first user 14 shares the electronic certificate on the social platform can cover a relatively large geographical area with the first user 14 being a center, and the utilization of the electronic certificate by the users on the social platform within the geographical area is improved.

For another example, a larger quantity of times for which the first user 14 uses a type of product indicates a greater social distance threshold corresponding to the first user 14 in the sharing condition, so that users with whom the first user 14 shares the electronic certificate on the social platform can cover users having a direct social relationship and users having an indirect social relationship with the first user 14 on the social platform, thereby improving the utilization of the electronic certificate.

The following further describes processing performed after the second user 16 satisfying the sharing condition is determined. In some embodiments, the transaction platform background 11 determines the target product that can be obtained by the first user 14 by using the first electronic certificate, and after the social platform background 12 determines, in step 104, the second user 16 satisfying the sharing condition on the social platform, the transaction platform 11 generates, based on an identifier of the second user 16, the second electronic certificate by using which the second user obtains the target product, and directly sends the second electronic certificate to the second client 15. The second electronic certificate carries an identifier of the second electronic certificate and the identifier of the second user 16 (the identifier carried in the second electronic certificate being different from the identifier carried in the first electronic certificate), so that the second user 16 can be authenticated by the transaction platform background 11 based on the second electronic certificate, and at least part of cost for obtaining the target product can be waived.

In the foregoing embodiment, the second electronic certificate is sent after the second user 16 satisfying the sharing condition is determined, so that the technical effect is achieved in which an electronic certificate of a preferred product is automatically pushed to the second user 16.

In some embodiments, when only some of the second users 16 satisfying the sharing condition may require using the electronic certificate of the target product, to avoid that the electronic certificate of the target product is directly sent to the second users 16 but not used by some users and to further improve the utilization of the electronic certificate, when determining the second user 16 satisfying the sharing condition, the social platform background 11 first sends sharing information (for example, sharing information posted in Moments on the social platform) for the first electronic certificate to the second user 16, and then when the second user 16 requires using the electronic certificate of the target product, the transaction platform interface is redirected to through clicking of the sharing information to collect the electronic certificate. The following performs description with reference to step 105 to step 108.

Step 105: The social platform background 12 sends sharing information for the first electronic certificate to the second client 15.

The sharing information includes an address directing to the transaction platform background 11 and used for guiding the second user 16 to collect, from the transaction platform background 11, the electronic certificate (the second electronic certificate) of the product (the target product) that corresponds to the first electronic certificate.

Step 106: The transaction platform background 11 receives a request sent by the second user 16 by using the second client 15 for obtaining a second electronic certificate.

After the second user 16 receives the sharing information for the first electronic certificate from the first user 14, if expecting to use the electronic certificate of the target product, the second user 16 sends, by using the second client 15, a request for the electronic certificate of the target product to the transaction platform background 11.

Further using FIG. 2 as an example for description, sharing information 152 for a brand 3-universal coupon deducting 10 yuan from your payment over 100 yuan 133 (the first electronic certificate) received from the first user 14 is loaded on a graphical interface 151 of the second client 15. If expecting to use a same brand 3-universal coupon deducting 10 yuan from your payment over 100 yuan as that of the first user 14, the second user 16 performs a trigger operation for collecting the universal coupon on the graphical interface 151.

Step 107: The transaction platform background 11 generates, based on an identifier of the second user 16, the second electronic certificate by using which the second user 16 obtains the target product.

In some embodiments, using FIG. 2 as an example, the transaction platform background 11 determines, based on the identifier of the first electronic certificate carried in the sharing request, a product of brand 3 (the target product) that can be obtained by the first user 14 by using the first electronic certificate, and the transaction platform background 11 generates, based on the identifier of the second user 16, a brand 3-universal coupon deducting 10 yuan from your payment over 100 yuan (the second electronic certificate, which has an identifier different from an identifier of the brand 3-universal coupon deducting 10 yuan from your payment over 100 yuan 133) by using which the second user 16 obtains the product of brand 3. The second electronic certificate carries the identifier of the second electronic certificate and the identifier of the second user 16, and recording data of the second electronic certificate is maintained on the transaction platform background 11.

For example, the recording data of the second electronic certificate includes: the identifier of the second electronic certificate, the identifier of the second user 16 to whom an electronic certificate is distributed, information (for example, a name or a serial number) about a product that can be used by the second user 16 by using the second electronic certificate, and information about a merchant providing the product (for example, a name of the merchant or an address of the merchant).

Based on the recording data of the second electronic certificate, the transaction platform background 11 authenticates the legality of the use of the second electronic certificate by the second user 16. The authentication succeeds if the identifier of the second user 16 and the identifier of the second electronic certificate carried in the second electronic certificate submitted by the second user 16 are consistent with corresponding identifiers in the recording data, and cost caused by the use of the product of brand 3 (the target product) by the second user 16 is waived.

Step 108: The transaction platform background 11 sends the second electronic certificate to the second client 15.

For the processing manner of using the second electronic certificate by the second user 16, refer to the descriptions of FIG. 4.

It can be learned from the foregoing steps that, the first user 14 spreads the first electronic certificate in the social relationship chain of the first user 14 by means of sharing, so that the second user 16 requiring using a corresponding product collects the second electronic certificate from the transaction platform background 11. Because users in the social relationship chain usually have same preferences, the utilization of an electronic certificate can be greatly improved by spreading the electronic certificate in the social relationship chain of the first user 14.

Figure 3B:
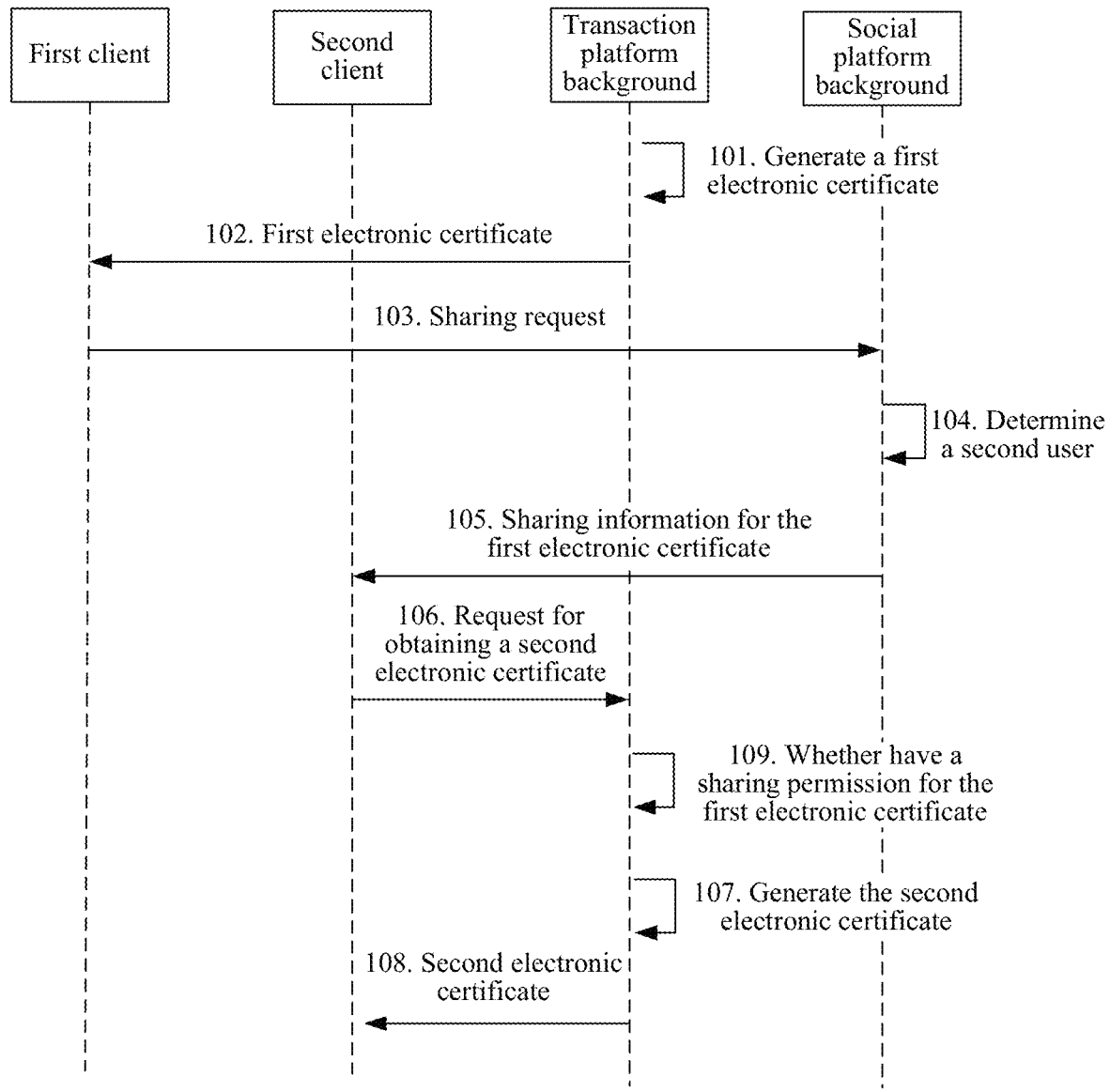

In some embodiments, the sharing of the first electronic certificate by the first user 14 needs to be controlled, to prevent the users on the social platform from being interfered with by information. Referring to FIG. 3B, FIG. 3B is another optional flowchart of the electronic certificate processing method. When receiving the sharing request for the first electronic certificate sent by the first client 13, before step 107, that is, before generating the second electronic certificate for the second user 16, the method further includes the following step:

Step 109: The transaction platform background 11 determines whether the first user 14 has a sharing permission for the first electronic certificate; and if yes, determines to perform a subsequent operation of generating the second electronic certificate for the second user 16 in response to the sharing request; or if no, skips responding to the sharing request, and does not perform subsequent processing.

By controlling the sharing permission of the first user 14, the first user 14 is prevented from frequently sharing the sharing information of the electronic certificate on the social platform and interfering with another user.

For example, if a feature value of the first electronic certificate does not exceed a feature value threshold, it is determined that the first user 14 has the sharing permission; or if exceeds, it is determined that the first user 14 does not have the sharing permission. During actual application, the feature value of the first electronic certificate may include, for example, at least one of the following: a quantity of times for which the first user 14 shares the first electronic certificate, or a frequency at which the first client 13 shares the first electronic certificate.

Figure 3C:
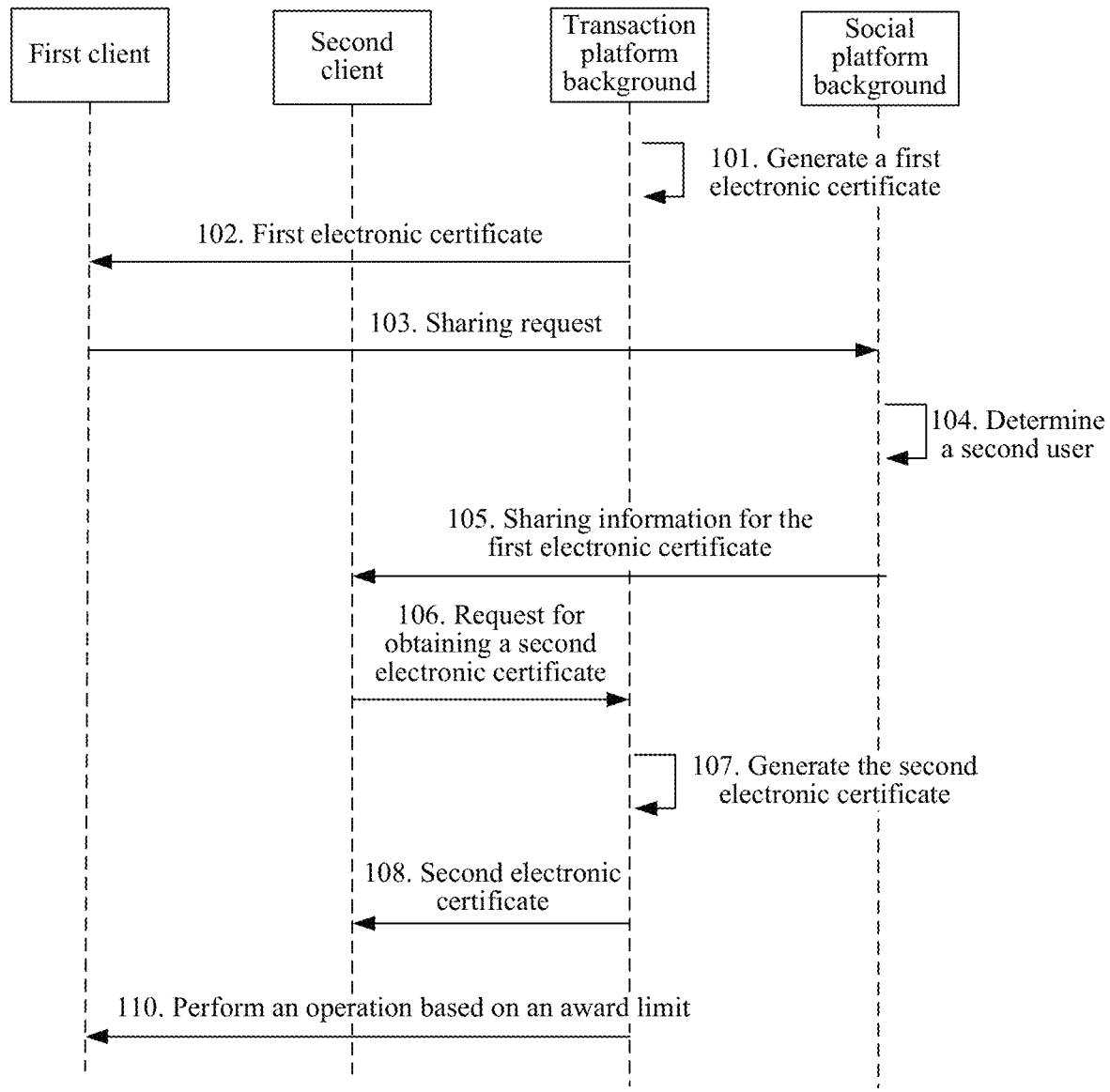

In some embodiments, to motivate the sharing behavior in which the first user 14 spreads the electronic certificate on the social platform and to improve the utilization of the electronic certificate, referring to FIG. 3C, FIG. 3C is another optional schematic flowchart of the electronic certificate processing method. Based on FIG. 3A, after the second electronic certificate is sent to the second user 16, the method further includes the following step:

Step 110: The transaction platform background 11 determines an award limit of the first user 14 according to a feature value of the first electronic certificate, and performs at least one of the following operations based on the award limit:

1) adding an account of money corresponding to the award limit to an account of the first user 14.

For example, the account of the first user 14 may be a social platform account of the first user 14, and a reward point, money and the like corresponding to the award limit or special preference for the product is added to the social platform account.

2) sending an electronic red envelope corresponding to the award limit to the first client 13.

3) sending an electronic certificate of a service whose cost corresponds to the award limit to the first client 13.

Figure 3D:
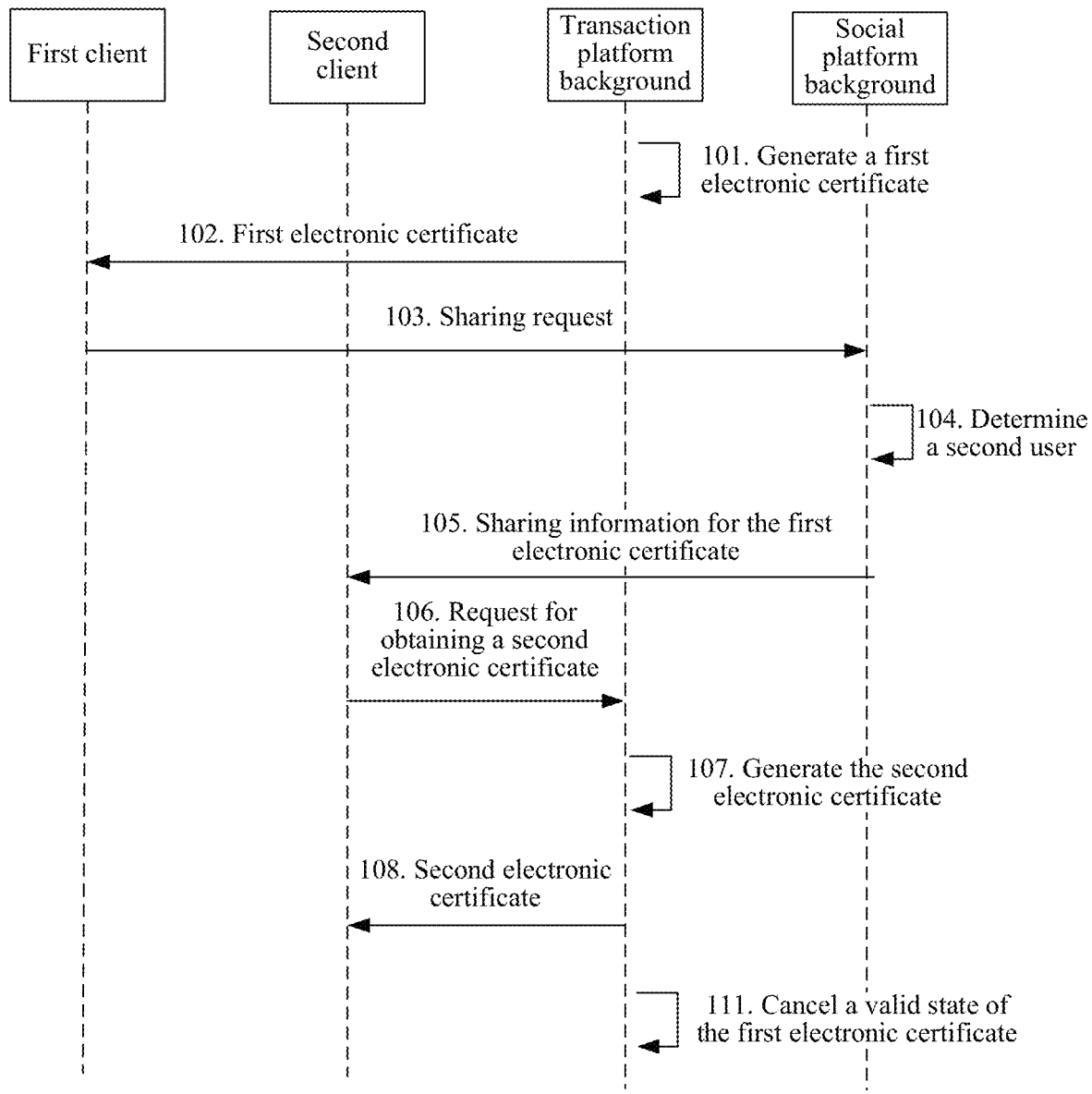

In some embodiments, after the first electronic certificate held by the first user 14 is shared on the social platform, considering that the first user 14 has the following requirement: sharing the first electronic certificate on the social platform only when the first user 14 does not need to use the first electronic certificate, correspondingly, referring to FIG. 3D, FIG. 3D is another optional schematic flowchart of the electronic certificate processing method, based on FIG. 3A, after the second electronic certificate is sent to the second user 16, the method further includes the following step:

Step 111: After generating the second electronic certificate by using which the second user 16 obtains the target product, the transaction platform background 11 cancels a valid state of the first electronic certificate, and skips responding to a request of the first user 14 for obtaining the target product.

That the transaction platform background 11 cancels the valid state of the first electronic certificate is equivalent to that the transaction platform background 11 deletes recording data correspondingly generated when the first electronic certificate is generated. In this case, there is no corresponding recording data when the first user 14 subsequently requests to use the electronic certificate, leading to that authentication cannot succeed, and the first electronic certificate is invalid on the first user side. Therefore, the electronic certificate no longer used by the user is recycled, and the impact on the utilization of invalid downloading of the first electronic certificate can be avoided.

Certainly, during actual implementation, to motivate the first user 14 to spread the electronic certificate on the social platform, the valid state of the first electronic certificate held by the first user 14 may be maintained.

The foregoing describes, with reference to FIG. 2, the processing in which the first user 14 shares the electronic certificate with the second user. As described above, the transaction platform background 11 may directly send the second electronic certificate to the second user 16 (the second client 15) according to the sharing request for the first electronic certificate sent by the first user 14 by using the first client 13 (the product that can be obtained by the second user 16 by using the second electronic certificate being the same as the product that can be obtained by the first user 14 by using the first electronic certificate), so that the electronic certificate is shared by the first user 14 with the second user 16. It is easy to understand based on the foregoing descriptions that the second user 16 may share an electronic certificate with the first user 14. This is described below.

Figure 3E:
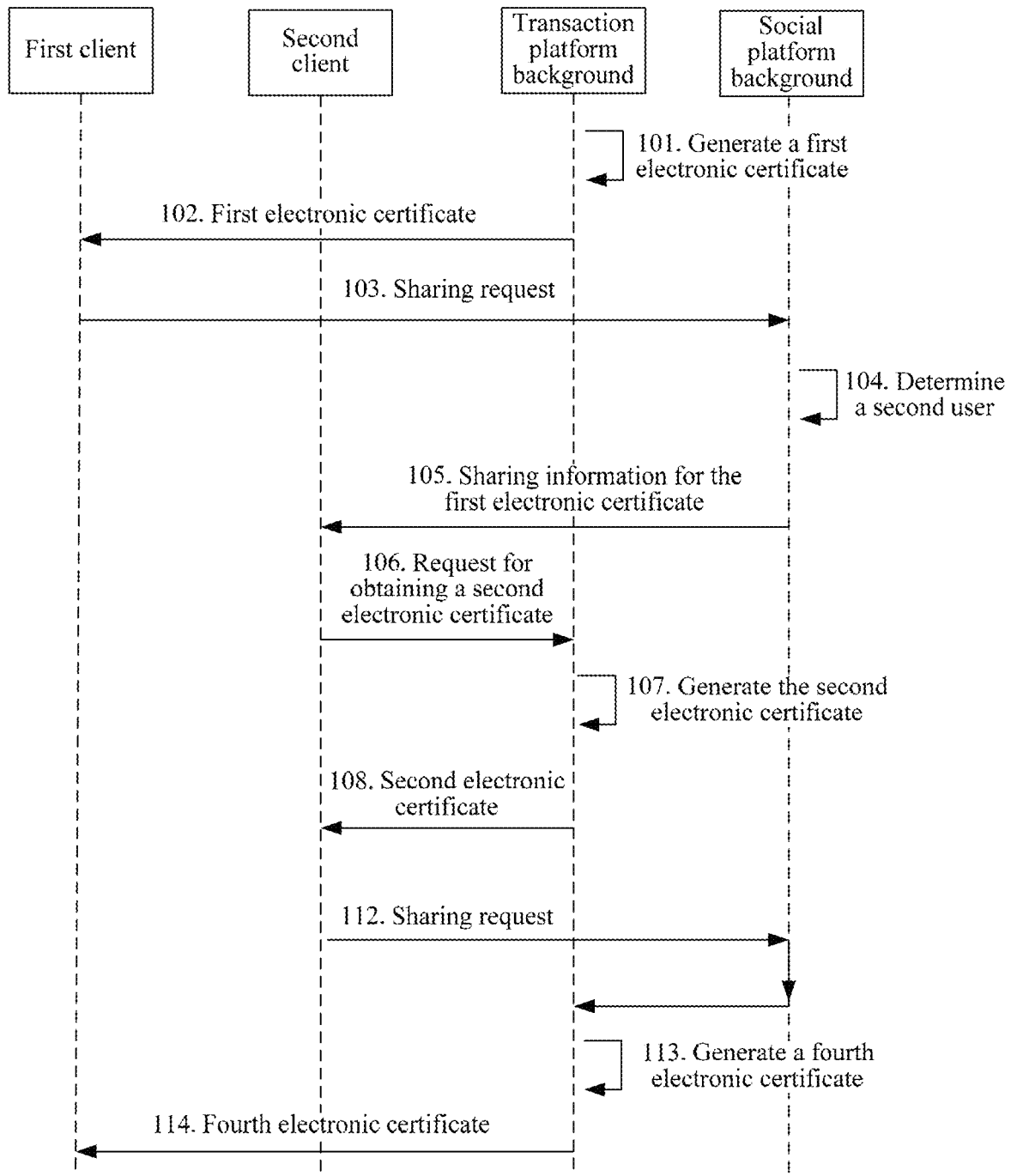

In some embodiments, referring to FIG. 3E, FIG. 3E is an optional schematic flowchart of the electronic certificate processing method. Based on FIG. 3A, the method further includes the following steps:

Step 112: The second user 16 issues, to the first user on the social platform background 12, a sharing request for a third electronic certificate stored on the second client 15 (where a product obtained by the second user 16 by using the third electronic certificate may be different from the product obtained by the first user 14 by using the first electronic certificate, for example, the products may be products from different merchants), and transfers the sharing request to the transaction platform background 11.

Step 113: The transaction platform background 11 generates a fourth electronic certificate for the first user 14 according to the sharing request.

The transaction platform background 11 determines, based on an identifier carried in the third electronic certificate, the product that can be obtained by the second user 16 by using the third electronic certificate, generates, based on the identifier of the first user 14, a fourth electronic certificate by using which the first user 14 obtains a corresponding product (that is, the product that can be obtained by the second user by using the third electronic certificate), and forms corresponding recording data (for example, an identifier of the fourth electronic certificate, the identifier of the second user, product information, and merchant information) on the transaction platform background 11.

Step 114: The transaction platform background 11 sends the fourth electronic certificate to the first client 13.

When the first user 14 obtains a product by using the fourth electronic certificate, the transaction platform background 11 authenticates, by using the recording data, the behavior of the first user 14 of obtaining a product by using the fourth electronic certificate, and waives cost for the first user 14 if the authentication succeeds.

It can be learned from the foregoing descriptions that, the second user 16 collects the second electronic certificate (the first electronic certificate and the second electronic certificate being used for collecting same products and for waiving cost) after the first user 14 shares the first electronic certificate. Furthermore, the first user 14 collects the fourth electronic certificate (the third electronic certificate and the fourth electronic certificate being used for collecting same products and for waiving cost) after the second user 16 shares the third electronic certificate. In this way, two-way sharing of electronic certificates can be performed between the first user 14 and the second user 16.

Specially, in the process shown in FIG. 3E in which the first user 14 and the second user 16 perform two-way sharing of electronic certificates, if the transaction platform background 11 cancels the valid state of the first electronic certificate (for example, deletes the recording data corresponding to the first electronic certificate) after the second user 16 obtains the second electronic certificate, and cancels a valid state of the third electronic certificate (for example, deletes the recording data corresponding to the second electronic certificate) after the first user 14 obtains the fourth electronic certificate, it is equivalent to that the electronic certificate of the first user 14 and the electronic certificate of the second user 16 are exchanged. During actual application, exchange of electronic certificates may be based on a geographical location (for example, a geographical location of a merchant providing a corresponding product, or a current geographical location of a user), and information about a merchant (for example, a type of the merchant, or a type of the product provided by the merchant). This is described by way of example below.

In an example in which electronic certificates are exchanged based on a geographical location and merchant information, referring to step 104 shown in FIG. 3E, if a second user 16 selected by the transaction platform background 11 from candidate second users 16 on the social platform satisfies the following sharing condition: an electronic certificate of a pre-determined type is stored on the second client 15 of the second user 16, and a location of a corresponding product that can be obtained by the second user 16 by using the electronic certificate of the pre-determined type (that is, a location of a merchant providing the corresponding product) is the same as a current location of the first user 14, when the first user 14 shares the second electronic certificate with the second user 16, as an exchange, the second user 16 shares the fourth electronic certificate with the first user 14, and the fourth electronic certificate enables the first user 14 to obtain a product provided by a merchant at the current location of the first user 14.

Figure 5A:
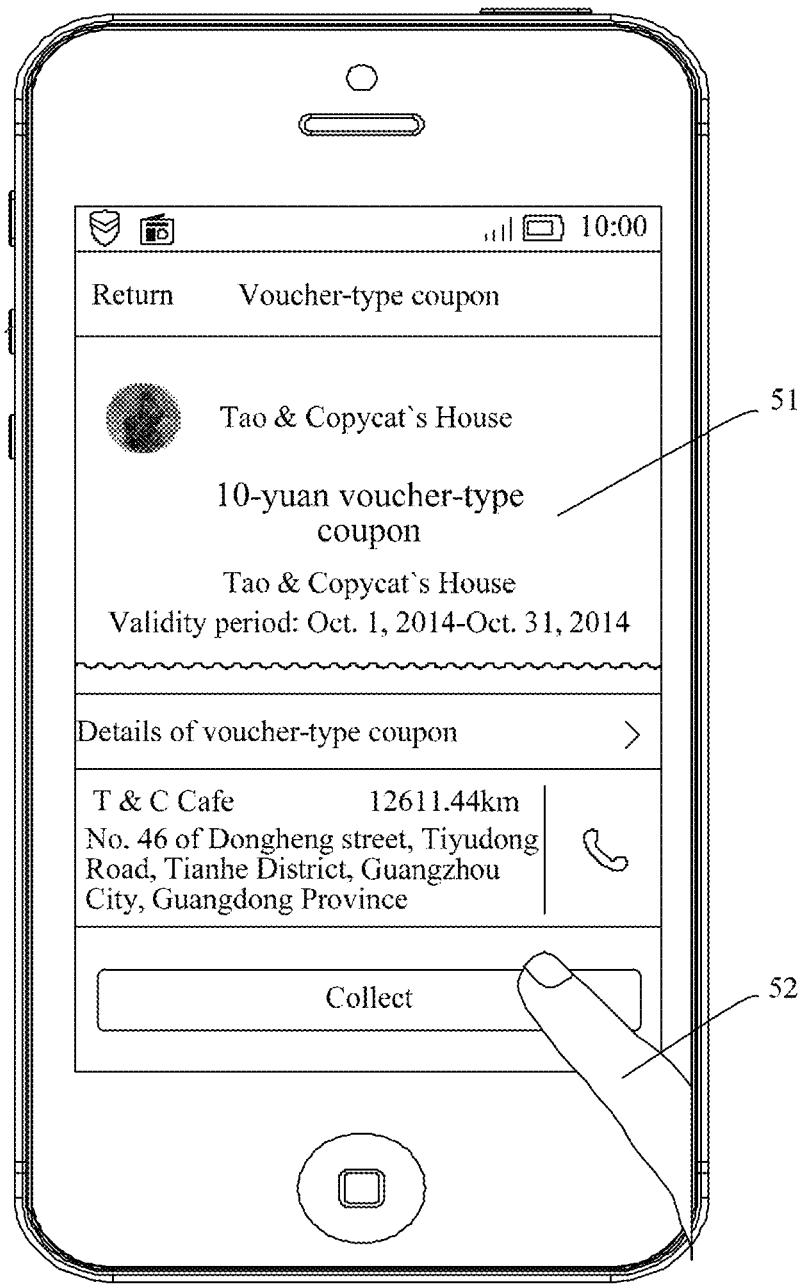
FIG. 5A is an optional schematic displaying diagram of collecting an electronic coupon according to an embodiment of the present disclosure.
Figure 5B:
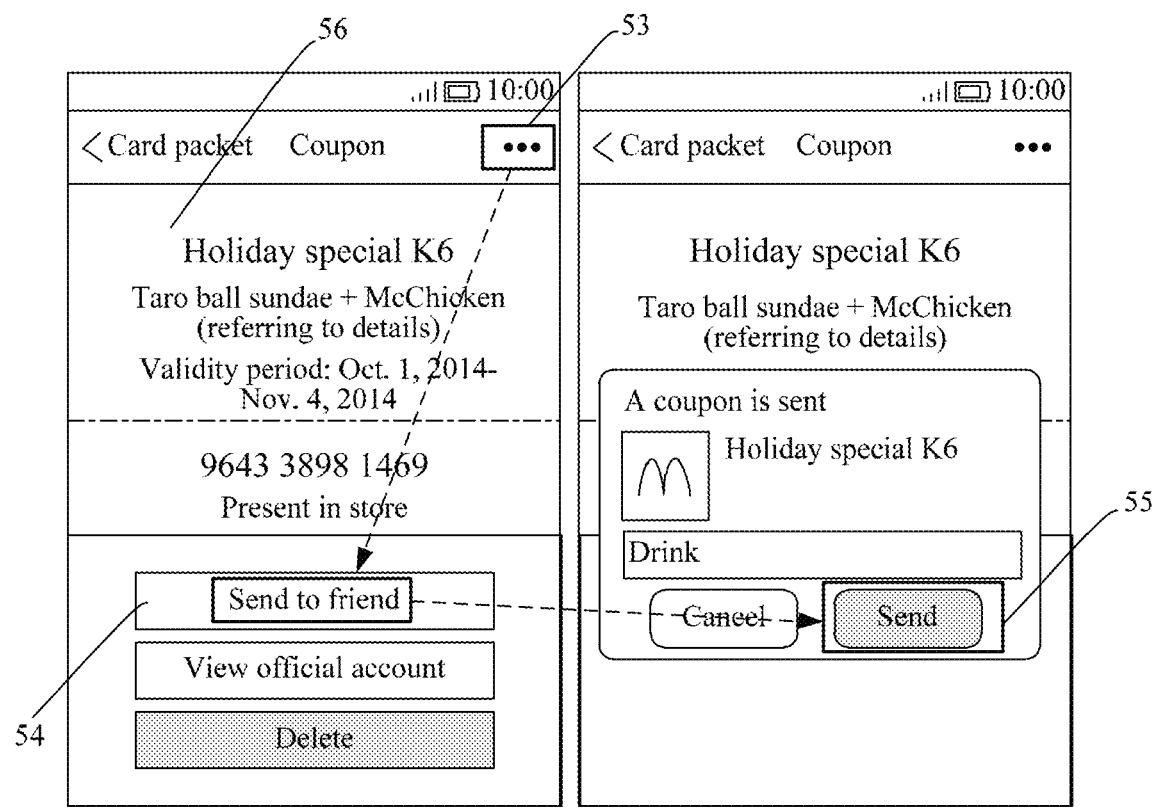
FIG. 5B is an optional schematic displaying diagram of sharing an electronic coupon according to an embodiment of the present disclosure.

For example, referring to FIG. 5B, the first user 14 stores a KFC electronic coupon on the first client 13 and the first user 14 is located at McDonald's. When the first user 14 expects to exchange the KFC electronic coupon for a McDonald's electronic coupon held by a user on the social platform, the first user 14 issues a sharing request for the KFC electronic coupon, determines that the second user 16 has the KFC electronic coupon, and sends sharing information for the KFC coupon to the second client 15 by using the social platform background 12. The transaction platform background 11 cancels, according to a request of the second user 16 for collecting the KFC coupon, a valid state of the KFC electronic coupon stored on the first client 13, and generates a KFC coupon (which carries the identifier of the second user 16 and an identifier of the coupon) based on the identifier of the second user 16 and sends the KFC coupon to the second client 15

As an exchange, the second user 16 sends a sharing request for the McDonald's coupon to the first client 13 by using the second client 15 and on the social platform background 12. The transaction platform background 11 cancels, according to a request of the first user 14 for collecting the McDonald's coupon, a valid state of the McDonald's electronic coupon stored on the second client 15 and generates a McDonald's coupon (which carries the identifier of the first user 14 and an identifier of the coupon) based on the identifier of the first user 14 and sends the McDonald's coupon to the first user 14, so that the first user 14 uses the received McDonald's electronic coupon at McDonald's.

A functional structure of an electronic certificate processing apparatus is described by using an example in which a transaction platform module in the electronic certificate processing apparatus is implemented as the transaction platform background 11 shown in FIG. 2, and a social platform module in the electronic certificate processing apparatus is implemented as the social platform background 12 (connected to the transaction platform) shown in FIG. 2.

The transaction platform background 11 is used for generating, based on an identifier of a first user 14, a first electronic certificate by using which the first user 14 obtains a target product, and sending the first electronic certificate to a first client 13.

For example, the target product may be determined in such manners:

Manner 1): The transaction platform background 11 sends information about each candidate product supporting obtaining of a corresponding electronic certificate to the first client 13, and extracts information about the target product from a request for an electronic certificate sent by the first client 13, the target product being a product selected by the first user 14 from the candidate products.

Manner 2): The transaction platform background 11 obtains a preference of the first user 14, compares the preference of the first user 14 with a feature of each candidate product, and determines the target product of the candidate products that satisfies the preference of the first user 14.

The social platform background 12 is used for receiving a sharing request for the first electronic certificate sent by the first client 13, and the transaction platform background determines, according to recording data of distributing an electronic certificate (for example, by using a data structure of user identifier-product name-merchant name) and an identifier of the first electronic certificate carried in the sharing request, the target product that can be obtained by the first user 14 by using the first electronic certificate.

The social platform background 12 is further used for determining a second user 16 having a social relationship with the first user on the social platform background 12 and satisfying a sharing condition, and sending sharing information for the first electronic certificate to the second user 16. The transaction platform background receives a request of the second user 16 for obtaining an electronic certificate, and generates, based on an identifier of the second user 16, a second electronic certificate by using which the second user 16 obtains the target product. The second electronic certificate and the first electronic certificate are different electronic certificates generated by the transaction platform background 11 for a same product used by users (that is, the target product). Therefore, the identifier carried in the second electronic certificate and the identifier carried in the first electronic certificate are different. For example, the identifiers may be different serial numbers.

The transaction platform background 11 is further used for sending the second electronic certificate to a second client 15. The second electronic certificate is used for enabling the second user 16 to obtain the target product.

It should be noted that, after generating the second electronic certificate by using which the second user 16 obtains the target product, the transaction platform background 11 may cancel a valid state of the first electronic certificate, and skip responding to a request of the first user 14 for obtaining the target product, so that the first electronic certificate held by the first user 14 is transferred to the second user 16. Certainly, to motivate the first user 14 to share the electronic certificate, after generating the second electronic certificate by using which the second user 16 obtains the target product, the transaction platform background 11 may alternatively continue to maintain the valid state of the first electronic certificate.

In some embodiments, the foregoing sharing condition may be set by the first user 14 when the first user 14 issues the sharing request and be transferred to the social platform background 12. The social platform background 12 determines a corresponding second user 16 based on the sharing condition extracted from the sharing request. Alternatively, in other embodiments, the sharing request issued by the first client 13 does not carry the sharing condition, so that the social platform background 12 automatically generates the sharing condition according to a feature of the first user 14 and determines a corresponding second user 16.

In some embodiments, the second user 16 may be determined based on the sharing condition in the following manners:

Manner 1): The social platform background 12 compares a geographical location of each candidate user having a social relationship with the first user on the social platform background 12 with a geographical location of the first user 14, and determines a candidate user that has a geographical location distance to the first user 14 less than a geographical distance threshold as the second user 16.

Manner 2): The social platform background 12 determines a candidate user that is of candidate users having a social relationship with the first user 14 on the social platform and that has a social distance to the first user 14 in a social relationship chain less than a social distance threshold (for example, a user whose social distance is 0 is a user having a direct social relationship, or a user whose social distance is greater than 1 is a user having an indirect social relationship) as the second user 16.

In some embodiments, the social platform background 12 selectively responds to the sharing request for the first electronic certificate issued by the first client 13. For example, when receiving the sharing request for the first electronic certificate sent by the first client 13, the social platform background 12 determines whether the first user 14 has a sharing permission for the first electronic certificate; and if yes, determines to respond to the sharing request; or if no, skips responding to the sharing request. The social platform background 12 may determine whether the first user 14 has a sharing permission in the following manner 1: if a feature value (for example, a quantity of times for which the first user 14 shares the first electronic certificate, or a frequency at which the first client 13 shares the first electronic certificate) of the first electronic certificate does not exceed a feature value threshold, determining that the first user 14 has the sharing permission; or if exceeds, determining that the first user 14 does not have the sharing permission.

In some embodiments, to motivate the first user 14 to share the first electronic certificate, and facilitate spreading of the first electronic certificate on the social platform, the transaction platform background 11 determines an award limit of the first user 14 according to a feature value of the first electronic certificate, and performs at least one of the following operations based on the award limit.

1) adding an account of money corresponding to the award limit to an account of the first user 14.

2) sending an electronic red envelope corresponding to the award limit to the first client 13.

3) sending an electronic certificate of a service whose cost corresponds to the award limit to the first client 13.

In some embodiments, the first user 14 and the second user 16 require exchanging electronic certificates. In this case, when the first user 14 issues the sharing request for the first electronic certificate and causes the second user 16 to obtain the second electronic certificate (by using which the second user obtains the product that can be obtained by the first user by using the first electronic certificate), the transaction platform background 11 platform is further used for canceling the valid state of the first electronic certificate. Because the first electronic certificate and the second electronic certificate are used for obtaining a same product, the first electronic certificate is shared by the first user 14 with the second user 16 after the valid state of the first electronic certificate is canceled.

The following continues to describe the foregoing embodiment. As an exchange, the social platform background 12 is further used for transferring a sharing request for a third electronic certificate issued by the second user to the transaction platform background 11. The transaction platform background 11 is further used for canceling a valid state of the third electronic certificate, generating, based on the identifier of the first user, a fourth electronic certificate used for obtaining a product the same as a product that can be obtained by using third electronic certificate, and sending the fourth electronic certificate to the first client 13. Because the third electronic certificate and the fourth electronic certificate are used for obtaining a same product, the third electronic certificate is shared by the second user 16 with the first user 14 after the valid state of the third electronic certificate is canceled.

According to the foregoing two-way electronic certificate sharing, the electronic certificate of the first user 14 and the electronic certificate of the second user 16 are exchanged. In particular, if a location of a corresponding product that can be obtained by using the third electronic certificate (that is, a location of a merchant providing the corresponding product) is a location of the first user, the first user 14 obtains, by using the first electronic certificate, an electronic certificate (the fourth electronic certificate) corresponding to the product provided by the merchant in a current location of the first user 14.

Figure 6:
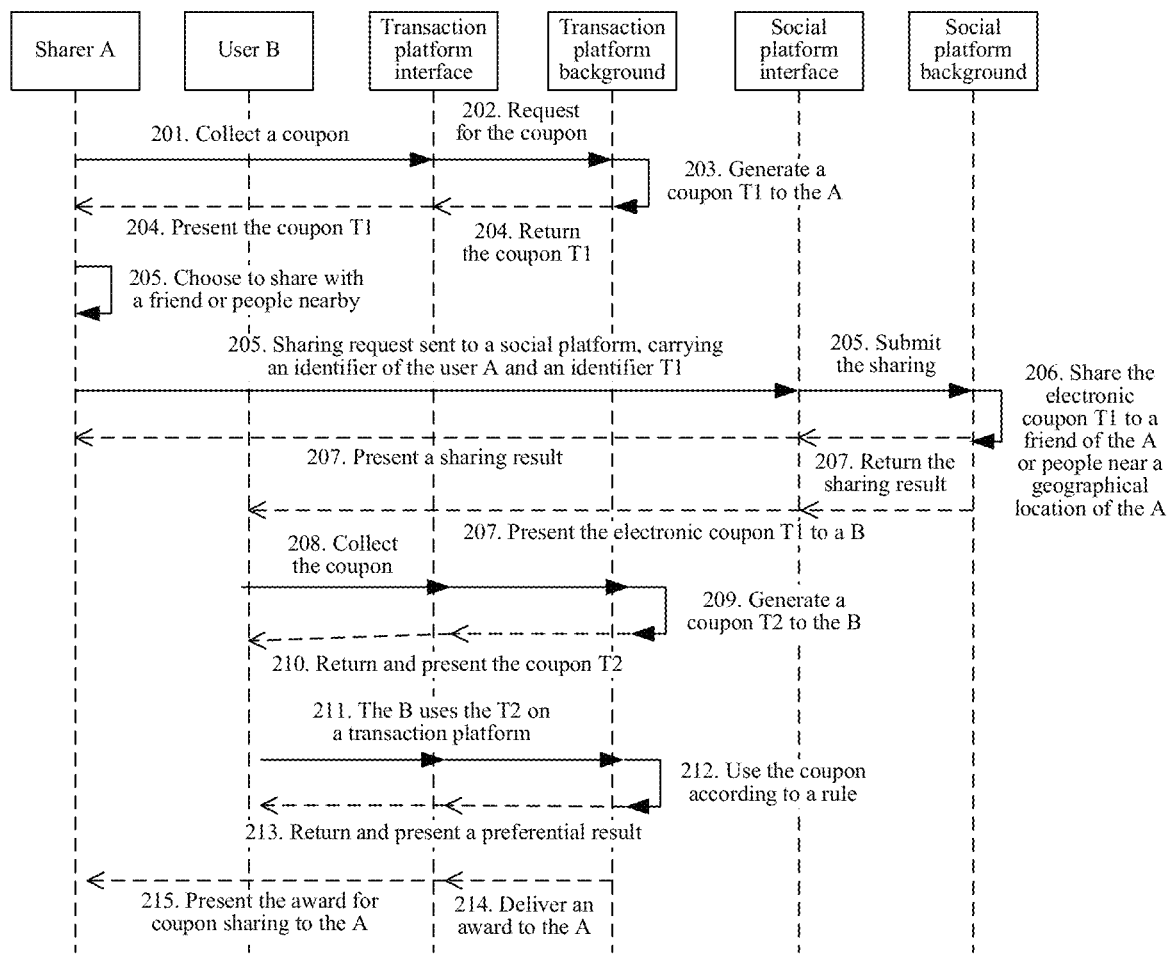
FIG. 6 is an optional schematic flowchart of an electronic certificate processing method according to an embodiment of the present disclosure.

Further, an example in FIG. 6 is used for description in which an electronic certificate processing apparatus is implemented as a transaction platform and a social platform. The transaction platform includes a transaction platform background (a transaction platform module), and a transaction platform interface that can be accessed by a client. The social platform includes a social platform background (a social platform module connected to the transaction platform module), and a social platform interface that can be accessed and loaded by a client. An example is used for description in which a user A shares an electronic coupon with a user B, including the following steps:

Step 201: The user A collects, according to a rule, an electronic coupon on the transaction platform interface by using a held client.

Step 202: The user A accesses a transaction platform background request on the transaction platform interface by using the held client, to generate an electronic coupon T1.

An example of step 201 is shown in FIG. 5A. When the user A performs a trigger operation 52 for collecting the electronic coupon T1 (using a 10 yuan voucher-type coupon 51 as an example) on the client, the client of the user A sends an ID of the user A to the transaction platform, so that the transaction platform generates an electronic coupon T1 having a unique identifier (for example, a serial number) based on the ID of the user A.

Step 203: The transaction platform background sends the electronic coupon T1 to the user A (that is, sends to the client of the user A) according to a rule, so that the user A views the presented coupon T1 on the client.

For example, the transaction platform background determines whether to send the coupon T1 according to the following rule: 1) whether the user A buys a specific product on the transaction platform; 2) whether a quantity of users sending electronic coupons (electronic coupons for a product the same as a product of the electronic coupon T1) exceeds a pre-determined quantity; 3) whether the user A is located at a specific pre-determined area for electronic coupon delivery.

Step 204: After downloading the electronic coupon T1 by using the client, the user A chooses to share the electronic coupon T1 to people nearby or a friend of the user A.

An example of step 204 is shown in FIG. 5B. After downloading the electronic coupon (where a "holiday special coupon" 56 is used as an example in FIG. 5B) by using the client, if expecting to share the electronic coupon with a friend on the social platform, the user A triggers an identifier 53 of a candidate operation menu presented in the electronic coupon on the client, triggers "send to friend" 54 in the candidate operation menu loaded on the client, and triggers a "determine to send" 55 operation after a sharing object is selected, thereby triggering sending of the sharing request for the electronic coupon.

Step 205: (The client of) the user A issues a sharing request for the electronic coupon T1 on the social platform interface, and transfers the electronic coupon to the social platform background.

The transaction platform background interacts with the social platform background, and the transaction platform background transfers an identifier of the user A and the identifier T1 of the coupon to the social platform background.

Step 206: The social platform background processes the sharing request, and sends sharing information (result) for the electronic coupon T1 to a friend of the user A or people near a geographical location of the user A according to a requirement of the user.

Step 207: The social platform background presents the sharing information for the electronic coupon T1 of the user A for the friend of the user A or the user B nearby.

Step 208: The user B collects an electronic coupon T2 on the transaction platform interface by using a client.

Figure 5C:
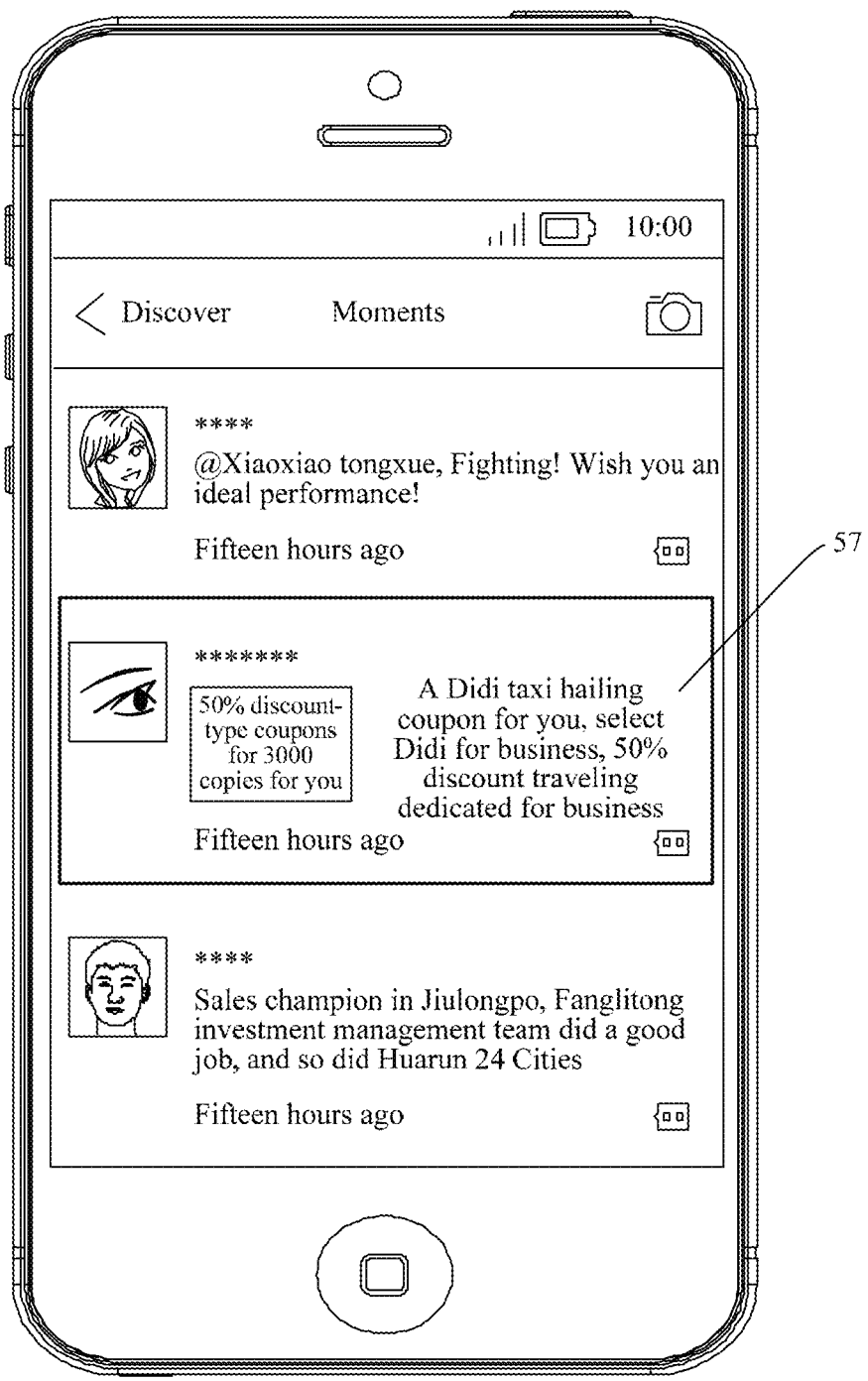
FIG. 5C is an optional schematic displaying diagram of presenting a shared electronic coupon according to an embodiment of the present disclosure.

The electronic coupon T2 and the electronic coupon T1 are electronic coupons corresponding to a same product. An example of the shared electronic coupon received by the user B is shown in FIG. 5C. Moments on the client of the user B includes a sharing message of the electronic coupon T1 (where a taxi hailing voucher-type coupon 57 is used as an example in FIG. 5C), and when the user B requires using the electronic coupon T1, the client of the user B is redirected to a collection page by clicking on the sharing message of the electronic coupon T1, to collect the electronic coupon T2 by using which a same product is obtained.

Step 209: The user B accesses the transaction platform background request on the transaction platform interface by using the client, to generate an electronic coupon T2.

Step 210: The transaction platform background sends the electronic coupon T2 to the user B (that is, sends to the client of the user B) according to a rule, so that the user B presents the electronic coupon on the client.

Step 211: The user B uses the electronic coupon T2 on the transaction platform.

Step 212: The transaction platform background calculates, according to a rule, cost after the user B uses the electronic coupon T2.

The user B can get a preference by presenting the electronic coupon T2 when buying a product.

Step 213: The transaction platform background sends a preference result to the user B (client), so that the user B can view the result (on the client of the user B).

Step 214: The transaction platform background delivers a corresponding award (for example, a rebate, a reward point, a special preference, or a red envelope) to the user A (the client of the user A).

Step 215: The client of the user A presents the award (for example, a coupon).

This embodiment of the present disclosure has the following beneficial effects: A spread range and users of a coupon are effectively expanded, and a user can actively share an electronic certificate to a friend or people nearby on a social platform, so that more people consumes at a merchant or on a transaction platform by using the electronic certificate. In this way, sales of the electronic certificate is optimized, and the utilization of the electronic certificate is improved.

A person skilled in the art may understand that, some or all of steps for implementing the method embodiments may be implemented by using hardware related to a program instruction. The program may be stored in a computer readable storage medium. When the program is executed, the steps included the method embodiments are performed. The storage medium includes various types of media that may store program code, for example, a removable storage device, a random access memory (RAM), a read-only memory (ROM), a magnetic disk, or an optical disc.

Alternatively, when the integrated unit of the present disclosure is implemented in a form of a software functional module and sold or used as an independent product, the integrated unit may be stored in a non-transitory computer-readable storage medium. Based on such an understanding, the technical solutions of the embodiments of the present disclosure essentially, or the part contributing to the related art may be implemented in a form of a software product. The computer software product is stored in a storage medium and includes several instructions for instructing a computer device (which may be a personal computer, a server, a network device, processing circuitry, or the like) to perform all or some of the methods described in the embodiments of the present disclosure. The foregoing storage medium includes: any media that can store program code, such as a removable storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An electronic certificate processing method, implemented by an electronic certificate processing apparatus, comprising:
   generating, by processing circuitry of the electronic certificate processing apparatus, based on an identifier of a first user, a first electronic certificate by using which the first user obtains a first target product, and sending the first electronic certificate to the first user;
   receiving, by the processing circuitry, a sharing request for the first electronic certificate;
   determining, by the processing circuitry, based on an identifier of the first electronic certificate, the first target product that can be obtained by the first user by using the first electronic certificate;
   automatically determining, by the processing circuitry, a second user having a social relationship with the first user and satisfying a sharing condition, and generating, based on an identifier of the second user, a second electronic certificate, an identifier carried in the second electronic certificate being different from that of the first electronic certificate; and
   sending, by the processing circuitry, the second electronic certificate to the second user, the second electronic certificate being used for enabling the second user to obtain the first target product,
   wherein the automatically determining the second user having the social relationship with the first user and satisfying the sharing condition comprises determining, by the processing circuitry, the second user is of candidate users having the social relationship with the first user, via a social platform, and that has a third electronic certificate used to obtain a second target product, a product obtaining location corresponding to the third electronic certificate being a current geographically determined location of the first user, wherein the second user is determined to have the social relationship with the first user based further on having a social distance to the first user in a social relationship chain less than a social distance threshold, the method further comprising:

generating, by the processing circuitry, a fourth electronic certificate based on the identifier of the first user, and sending the fourth electronic certificate to the first user; and canceling, by the processing circuitry, a valid state of the third electronic certificate of the second user and a valid state of the first electronic certificate of the first user, wherein the fourth electronic certificate being used for enabling the first user to obtain the second target product.

2. The method according to claim 1, further comprising:
obtaining, by the processing circuitry, a preference of the first user, comparing the preference of the first user with a feature of each of a plurality of candidate products, and determining the first target product of the candidate products that satisfies the preference of the first user.

3. The method according to claim 1, further comprising:
sending, by the processing circuitry, information about each of a plurality of candidate products supporting obtaining of a corresponding electronic certificate to the first user; and extracting, by the processing circuitry, information about the first target product from an electronic certificate request sent by the first user, the first target product being a product selected by the first user from the candidate products.

4. The method according to claim 1, further comprising:
determining, by the processing circuitry, an award limit of the first user according to a feature value of the first electronic certificate, and performing at least one of the following operations based on the award limit:

adding, by the processing circuitry, an account of money corresponding to the award limit to an account of the first user;

sending, by the processing circuitry, an electronic red envelope corresponding to the award limit to the first user; or sending, by the processing circuitry, an electronic certificate of a service whose cost corresponds to the award limit to the first user.

5. The method according to claim 4, wherein
the feature value of the first electronic certificate comprises at least one of the following: a quantity of times for which the first user shares the first electronic certificate, or a frequency at which the first user shares the first electronic certificate.

6. An electronic certificate processing apparatus, comprising:
processing circuitry configured to
generate, based on an identifier of a first user, a first electronic certificate by using which the first user obtains a first target product, and send the first electronic certificate to the first user; and determine, based on an identifier of the first electronic certificate, the first target product that can be obtained by the first user by using the first electronic certificate;

receive a sharing request for the first electronic certificate, and automatically determine a second user having a social relationship with the first user and satisfying a sharing condition; and generate, based on an identifier of the second user, a second electronic certificate, and send the second electronic certificate to the second user, an identifier carried in the second electronic certificate being different from that of the first electronic certificate and being used for enabling the second user to obtain the first target product, wherein the processing circuitry automatically determines the second user has the social relationship with the first user and satisfies the sharing condition by determining the second user is of candidate users having the social relationship with the first user, via a social platform, and that has a third electronic certificate used to obtain a second target product, a product obtaining location corresponding to the third electronic certificate being a current geographically determined location of the first user, wherein the second user is determined to have the social relationship with the first user based further on having a social distance to the first user in a social relationship chain less than a social distance threshold, the processing circuitry being further configured
generate a fourth electronic certificate based on the identifier of the first user, and send the fourth electronic certificate to the first user; and cancel a valid state of the third electronic certificate of the second user and a valid state of the first electronic certificate of the first user, wherein the fourth electronic certificate is used for enabling the first user to obtain the second target product.

7. The apparatus according to claim 6, wherein
the processing circuitry is further configured to: obtain a preference of the first user, compare the preference of the first user with a feature of each of a plurality of candidate products, and determine the first target product of the candidate products that satisfies the preference of the first user.

8. The apparatus according to claim 6, wherein
the processing circuitry is further configured to: send information each of a plurality of candidate products supporting obtaining of a corresponding electronic certificate to the first user; and extract information about the first target product from an electronic certificate request sent by the first user, the first target product being a product selected by the first user from the candidate products.

9. The apparatus according to claim 6, wherein
the processing circuitry is further configured to: compare a geographical location of each of a plurality of candidate users having a social relationship with the first user with a geographical location of the first user, and determine a user of the candidate users that has a geographical location distance to the first user less than a geographical distance threshold.

10. The apparatus according to claim 6, wherein
the processing circuitry is further configured to extract a sharing condition set by the first user from the sharing request, or generate a sharing condition according to a feature of the first user.

* * * * *